(12) United States Patent
Kim et al.

(10) Patent No.: US 7,083,127 B2
(45) Date of Patent: Aug. 1, 2006

(54) APPARATUS AND METHOD FOR MODIFYING SURFACE OF POLYMER POWDER BY ROTATIONAL ULTRASONIC TREATMENT

(76) Inventors: Jin Kuk Kim, Pyunggeo 2-Cha Hyundai Apt. 210-1504, Sinan-dong 454-2, Jinju-si, 660-908, Gyeongsangnam-do (KR); Chang-Eung Lee, Uruk Apt. 703-1306, 17-9, Sanbon-dong 1146-11, Gunpo-si, 435-040, Gyeonggi-do (KR)

( * ) Notice: Subject to any disclaimer, the term of this patent is extended or adjusted under 35 U.S.C. 154(b) by 56 days.

(21) Appl. No.: 10/677,244

(22) Filed: Oct. 3, 2003

(65) Prior Publication Data
US 2004/0251328 A1 Dec. 16, 2004

(30) Foreign Application Priority Data
Jun. 13, 2003 (KR) ................ 10-2003-0038131

(51) Int. Cl.
*B02C 19/18* (2006.01)

(52) U.S. Cl. .............. 241/1; 241/301; 241/DIG. 31

(58) Field of Classification Search .............. 241/1, 241/301, DIG. 31, 261.2, 261.3, 30
See application file for complete search history.

(56) References Cited

U.S. PATENT DOCUMENTS

| | | | | |
|---|---|---|---|---|
| 3,725,314 A | * | 4/1973 | Pelofsky | 521/44.5 |
| 4,474,314 A | * | 10/1984 | Roggenburg, Jr. | 222/494 |
| 5,538,191 A | * | 7/1996 | Holl | 241/1 |

FOREIGN PATENT DOCUMENTS

| | | |
|---|---|---|
| DE | 301979 | * 10/1994 |
| KR | 1995-7002219 | 6/1995 |
| KR | 2001-0088574 | 9/2001 |
| WO | WO 94/00497 | 1/1994 |

* cited by examiner

*Primary Examiner*—Mark Rosenbaum
(74) *Attorney, Agent, or Firm*—Whitham, Curtis, Christofferson & Cook P.C.

(57) ABSTRACT

An apparatus and a method for modifying the surface of a polymer powder utilizes a rotational ultrasonic treatment that pulverizes polymer materials, such as rubber, waste rubber, and plastics, and modifies the surface, so that the polymer materials can be recycled more efficiently. A hopper feeds the pulverized polymer powder. A rotor which is linked to the bottom of the hopper as an integrated body, is linked to a driving mechanism through a power transfer device, and rotates drive. A rotating disk is linked to the bottom of the rotor as an integrated body, and is provided with a downsloped plane. A shaft extends through the hopper, the rotor, and the rotating disk, and discharges the polymer powder fed from the hopper out of the bottom of the rotating disk. An ultrasonic vibrator is positioned at the bottom of the rotating disk, and modifies the polymer powder fed by the shaft using ultrasonic waves.

6 Claims, 6 Drawing Sheets

Before Ultrasonic Treatment

Fig. 6

After Ultrasonic Treatment

Fig. 7

APPARATUS AND METHOD FOR MODIFYING SURFACE OF POLYMER POWDER BY ROTATIONAL ULTRASONIC TREATMENT

BACKGROUND OF THE INVENTION

1. Field of the Invention

The present invention relates to an apparatus and a method of modifying surface of polymer powder by rotational ultrasonic treatment, and more particularly, to an apparatus and a method for modifying surface of polymer powder by rotational ultrasonic treatment that pulverize polymer materials, such as rubber, waste rubber, and plastics, and give rotational ultrasonic treatment to the polymer powder to modify its surface, so that the polymer materials can be recycled more efficiently.

2. Description of Related Art

With the rapid development in auto industry, there has been a growing concern on the treatment of waste rubber and waste tires on how to utilize those resources by recycling as well as protecting our environment by doing the same.

However, such efforts had not been successful because of the cost and insufficient technical means developed thus far, and most of them had been either burnt or buried underground, thereby contaminating the environment.

As such, many researchers have been focused on finding effective means for recycling waste rubber and waste tiers, and as a result, there were developed a few methods of chemical treatment using organic solvents and surface treatment by illuminating corona or plasma.

However, waste rubber modified by the above methods is hardly mixed with other materials, and it thus raises problems of physical properties and surface characteristics.

Therefore, a method of modifying waste tires using ultrasonic wave was proposed. This method was first designed by Prelofsky in the 1970s and was refined by Isayev in 1990.

Unlike the radiation technique, the ultrasonic treatment or modification of waste tires using ultrasonic vibration breaks only S—S bonds without affecting C—C bonds. Accordingly, the polymer does not lose its inherent physical properties.

For example, the present inventors submitted an application for a patent about "Method and Apparatus of Surface-Modifying for Waste Rubber using Ozone/Ultrasonic Wave" [Korea Patent Publication No. 2001-0088574(Sep. 28, 2001)]. The apparatus comprises a hopper, an extruder which is linked to the lower part of the hopper and extrudes waste rubber particle and ozone gas flowing into the hopper, an ozone gas outlet which is positioned at one end of the extruder and exhausts the ozone gas, a vacuum pump which is positioned at one end of the ozone gas outlet, a hood which is linked to the vacuum pump and exhausts the ozone gas, an ultrasonic vibrator which is positioned at the end of the extruder and generates ultrasonic wave, a controller that controls the ultrasonic vibrator, and an outlet which discharges the modified powder. This apparatus modifies surface of waste rubber using ozone and ultrasonic wave.

For another example, Korea Patent Publication No. 1995-7002219 (Jun. 19, 1995) discloses "Continuous Ultrasonic Desulfurization of Vulcanized Elastomer". This patent provides an apparatus comprising: a reactor which has one reactor outlet opening that can continuously feed vulcanized or cross-linked elastomer powder reactor; at least one ultrasonic horn; at least one binding means for binding each ultrasonic horn aligned to the axial direction of the reactor outlet opening; and an ultrasonic wave generator positioned at the end of each ultrasonic horn, which is positioned at a predetermined distance from a transverse plane marking the end of the reactor outlet opening and from a transverse plane marking the tip of the ultrasonic wave generator, whose diameter is larger than that of the reactor outlet opening, and which is sufficient for desulfurization or decrosslinking of the elastomer. The apparatus breaks carbon-sulfur (C—S) bonds, sulfur-sulfur (S—S) bonds, and carbon-carbon (C—C), if necessary, of the vulcanized elastomer.

This surface-modifying apparatus reduces sulfur crosinkage by spatial expansion due to intramolecular pore activation, and improves physical properties of waste tires by ultrasonic surface treatment. Therefore, the binding characteristics and physical properties of waste rubber powder are improved, and thus resources recycling effect becomes substantial.

However, because the ultrasonic treatment was done only at one side of the waste rubber powder in the conventional modification of waste tires, the treatment effect was not good. Moreover, it was not applicable to a large-scale modification.

SUMMARY OF THE INVENTION

An object of the present invention is to provide an apparatus and a method for modifying surface of polymer powder by rotational ultrasonic treatment that pulverize polymer materials, such as rubber, waste rubber, and plastics, and give rotational ultrasonic treatment to the polymer powder to modify its surface, so that the polymer materials can be recycled more efficiently.

DETAILED DESCRIPTION AND THE PREFERRED EMBODIMENTS

The present invention is characterized by an apparatus comprising: a hopper which feeds pulverized polymer powder; a rotor which is linked to the bottom of the hopper as an integrated body, is linked to a driving means through a power transferring means, and rotates by the power transferred from the driving means; a rotating disk which is linked to the bottom of the rotor as an integrated body, and is provided with a downsloped plane; a shaft which extends through centers of the hopper, the rotor, and the rotating disk, and discharges the polymer powder fed from the hopper out of the bottom of the rotating disk; an ultrasonic vibrator which is positioned at the bottom of the rotating disk with a gap, and modifies the polymer powder fed by the shaft using ultrasonic wave; a converting means which is linked to the bottom of the ultrasonic vibrator, and comprises a booster and a converter; and a generator which is linked to the converting means through a cable.

The present invention is also characterized by the rotating disk which is provided with a downsloped plane, so that the polymer powder can be easily discharged.

The present invention is also characterized by an apparatus which further comprises a discharging plate that encloses the gap between the rotating disk and the ultrasonic vibrator, in order to collect the surface-modified polymer powder discharged outward.

The present invention is also characterized by the ultrasonic vibrator which is installed on a second supporting plate that can move up and down through rails, in order to control the gap to the rotating disk.

The present invention is also characterized by the power transferring means which comprises a timing belt and a pulley.

The present invention is also characterized by a method for modifying surface of polymer powder by rotational ultrasonic treatment which feeds polymer powder between the rotating disk and the ultrasonic vibrator. The polymer powder is treated by ultrasonic wave while being rotated, and is discharged by centrifugal force due to the rotation of the rotating disk.

The present invention is also characterized by controlling of modification effect and amount of polymer powder to be modified through control of rotation rate of the rotating disk, and gap between the rotating disk and the ultrasonic vibrator.

Examples of the polymer powder according to the present invention are powder of rubber, waste rubber, waste tires or plastic.

Figure 1:
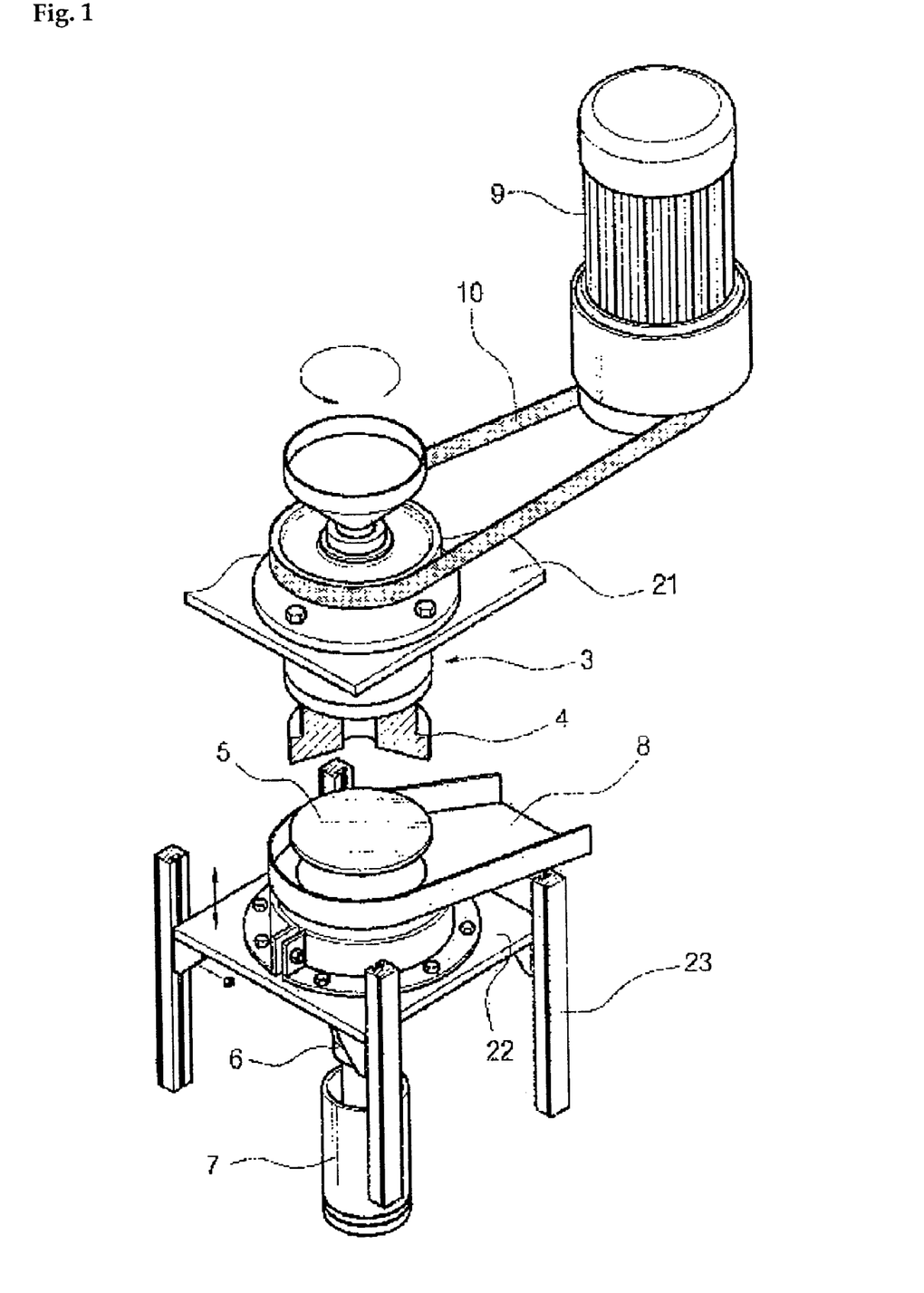
FIG. 1 is a partial cross-sectional perspective view of an apparatus for modifying surface of polymer powder by rotational ultrasonic treatment according to the present invention.
Figure 2:
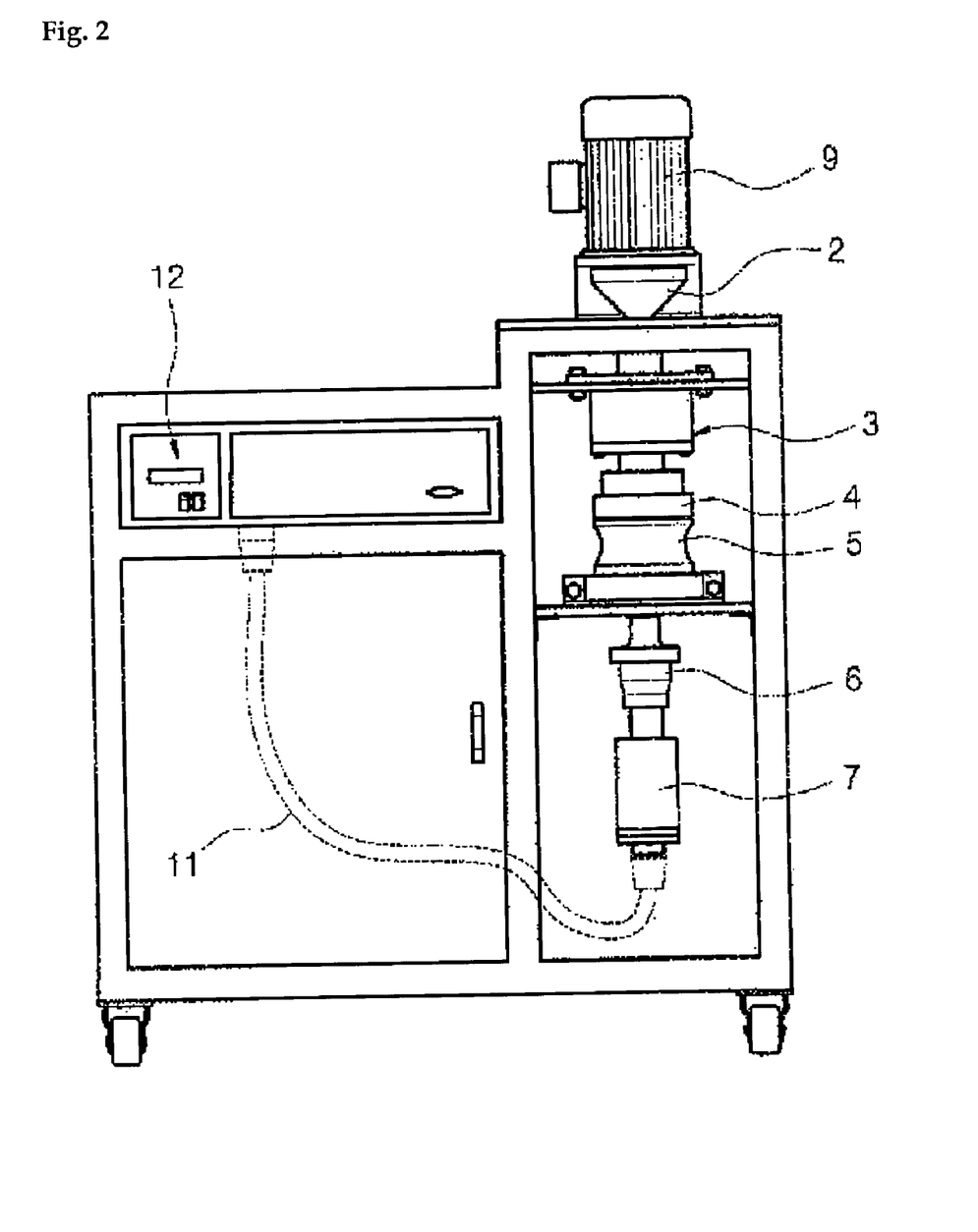
FIG. 2 is a front view of an apparatus for modifying surface of polymer powder by rotational ultrasonic treatment according to the present invention.
Figure 3:
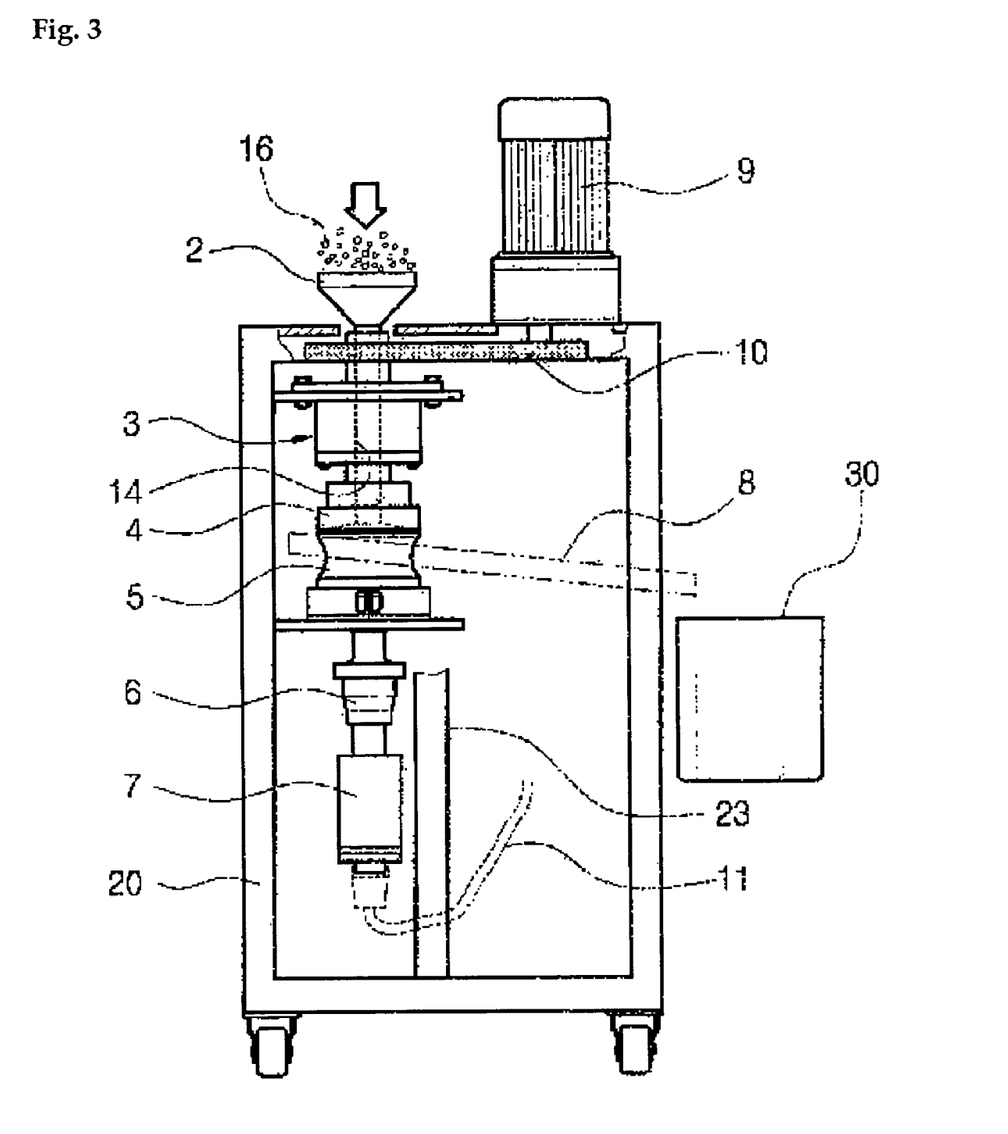
FIG. 3 is a side view of an apparatus for modifying surface of polymer powder by rotational ultrasonic treatment according to the present invention.
Figure 4:
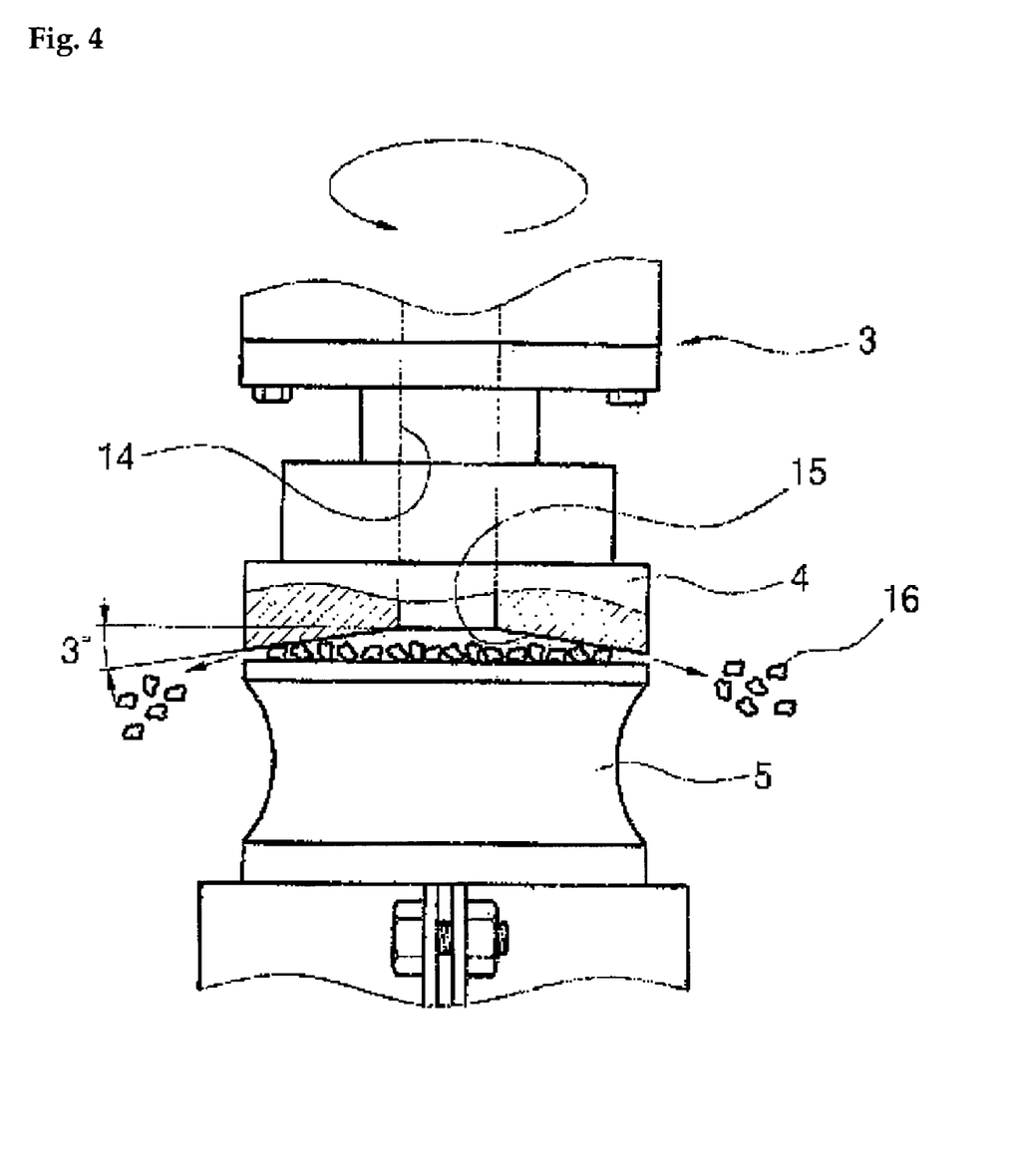
FIG. 4 shows waste rubber powder discharged after ultrasonic vibration and ultrasonic treatment.
Figure 5:
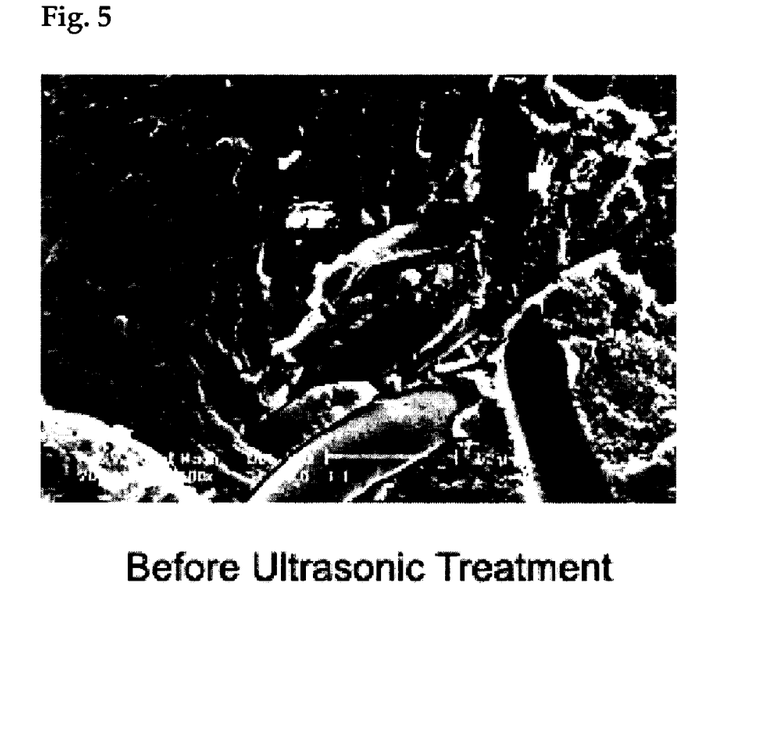
FIG. 5 and FIG. 6 are SEM (scanning electron microscope) photographs of vulcanized waste rubber before and after ultrasonic treatment.
Figure 6:
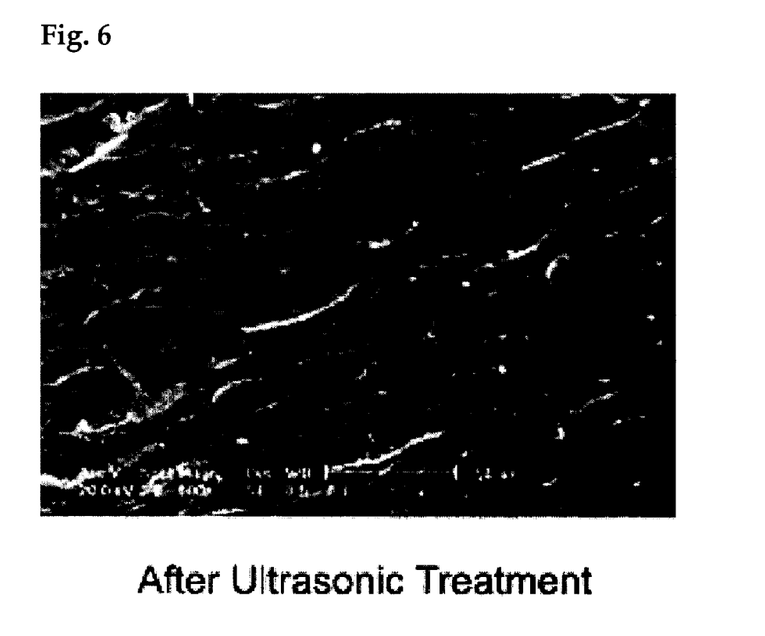
Figure 7:
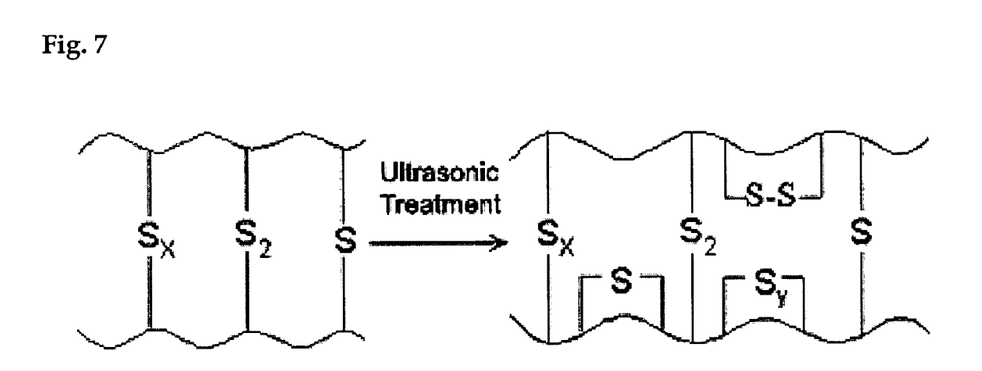
FIG. 7 shows change of vulcanized rubber structure before and after ultrasonic treatment.

Hereinafter, the present invention is described in more detail with reference to the drawings, wherein:

FIG. 1 is a partial cross-sectional perspective view of an apparatus for modifying surface of polymer powder by rotational ultrasonic treatment according to the present invention, and FIG. 2 is a front view of an apparatus for modifying surface of polymer powder by rotational ultrasonic treatment according to the present invention;

FIG. 3 is a side view of an apparatus for modifying surface of polymer powder by rotational ultrasonic treatment according to the present invention, and FIG. 4 shows waste rubber powder discharged after ultrasonic vibration and ultrasonic treatment; and FIG. 5 and FIG. 6 are SEM (scanning electron microscope) photographs of vulcanized waste rubber before and after ultrasonic treatment, and FIG. 7 shows change of vulcanized rubber structure before and after ultrasonic treatment.

As already known, the ultrasonic treatment or modification of polymer materials using ultrasonic vibration breaks only the S—S bonds without affecting the C—C bonds. Accordingly, the polymer does not lose its inherent physical properties.

Therefore, the apparatus and the method for modifying surface of polymer powder by rotational ultrasonic treatment of the present invention utilize the known methods. The present invention relates to an apparatus and a method for modifying surface of polymer powder by rotational ultrasonic treatment that pulverize polymer materials, such as rubber, waste rubber, and plastics, to powder having a particle size ranging from several millimeters to tens of micrometers, and give rotational ultrasonic treatment to the polymer powder to modify its surface.

As shown in the drawings, the apparatus for modifying surface of polymer powder by rotational ultrasonic treatment of the present invention comprises: a hopper 2 which feeds pulverized polymer powder 16; a rotor 3 which is linked to the bottom of the hopper 2 as an integrated body, is linked to a driving means through a power transferring means, and rotates by the power transferred from the driving means; a rotating disk 4 which is linked to the bottom of the rotor 3 as an integrated body by a bolt, and is provided with a downsloped plane 15 at the center; a shaft 13 which extends through centers of the hopper 2, the rotor 3, and the rotating disk 4, and discharges the polymer powder 16 fed from the hopper 2 out of the bottom of the rotating disk 4; an ultrasonic vibrator 5 which is positioned at the bottom of the rotating disk 4 with a gap, and modifies the polymer powder 16 fed by the shaft 13 using ultrasonic wave; a converting means which is linked to the bottom of the ultrasonic vibrator 5, and comprises a booster 6 and a converter 7; and a generator 12 which is linked to the converting means through a cable 11.

More specifically, the hopper 2, which feeds pulverized polymer powder 16 having a particle size ranging from several millimeters to tens of micrometers, is positioned on the body 20 of the apparatus for modifying surface of polymer powder by rotational ultrasonic treatment of the present invention. And, a driving means, such as a motor 9, is positioned at the opposite side.

The rotor 3 is linked to the bottom of the hopper 2. The rotor 3 is linked to the motor 9 through a power transferring means, i.e., a combination of a timing belt 10 and a pulley, and rotates by the power transferred from the driving means.

The rotating disk 4 is linked to the bottom of the rotor 3 as an integrated body by a bolt. As the rotor 3 rotates, the rotating disk 4 also rotates.

The shaft 13 extends through centers of the hopper 2, the rotor 3, and the rotating disk 4, and discharges the polymer powder 16 fed from the hopper 2 out of the bottom of the rotating disk 4.

The rotor 3, which is linked to the hopper 2, the shaft 13, and the rotating disk 4 as an integrated body, is attached to a first supporting plate 21 inside the body 20, and is supported by the first supporting plate 21.

The ultrasonic vibrator 5 and the converting means comprising the booster 6 and the converter 7, which are positioned at the bottom of the rotating disk 4, are attached to a second supporting plate 22 inside the body 20.

The ultrasonic vibrator 5 is positioned at the bottom of the rotating disk 4 with a gap. The pulverized polymer powder fed from the hopper 2 and discharged by the shaft 13 is treated with ultrasonication between the ultrasonic vibrator 5 and the rotating disk 4.

The bottom of the rotating disk 4 is provided with a downsloped plane 15, so that the polymer powder 16 can be easily discharged.

The sloping angle of the sloping plane 15 can be different depending on the kind and particle size of the polymer powder. Preferably, the sloping angle is 3° to 10°. If the sloping angle is smaller than 3°, the polymer powder 16 is not discharged easily. In contrast, if it is larger than 10°, the modifying effect is insufficient.

The polymer powder located between the ultrasonic vibrator 5 and the rotating disk 4 is pushed outward by the centrifugal force due to rotation of the rotating disk 4, treated with ultrasonication there, and then discharged outside.

The surface-modified polymer powder 16 is stored in a storage box 30 passing through a discharging plate 8 which encompasses the lower gap between the rotating disk 4 and the ultrasonic vibrator 5.

There are rails 23 at each inner corner of the body 20. The first supporting plate 21 and the second supporting plate 22 move up and down through these rails 23.

Therefore, the gap between the rotor 3 and the ultrasonic vibrator 5 can be controlled by fixing the first supporting plate 21 and moving the second supporting plate 22 upward or downward.

The gap between the rotating disk 4 and the ultrasonic vibrator 5 may differ depending on the kind and particle size of the polymer powder 16. Preferably, the gap is smaller than 10 mm.

If the gap between the rotating disk 4 and the ultrasonic vibrator 5 exceeds 10 mm, the modifying effect is insufficient.

The rotation speed of the rotating disk 4 can be controlled by the motor 9. Preferably, the rotation speed of the rotating disk 4 is 10 to 400 rpm. If the rotation speed is below 10 rpm, the modification takes too much time. Otherwise, if it exceeds 400 rpm, the modifying effect is insufficient.

The present invention utilizes the principle of a grinding stone. That is, the polymer powder is fed between the rotating disk and the ultrasonic vibrator, treated with ultrasonication while being rotated, and then discharged outward by the centrifugal. The present invention maximizes modification efficiency by modifying the entire surface of the polymer powder.

The method for modifying surface of polymer powder by rotational ultrasonic treatment according to the present invention offers the following advantage—The surface modification degree and quantity of polymer powder can be controlled by controlling the rotation speed of the rotating disk, to which the polymer powder is fed, and the gap between the rotating disk and the ultrasonic vibrator.

Therefore, this method is useful for mass treatment of waste rubber, etc., since the surface of polymer powder can be modified continuously by using ultrasonic wave.

Hereinafter, the present invention is described in more detail through Example and Experimental Example. However, the following Example and Experimental Example are only for the understanding of the present invention, and they should not limit the scope of the present invention.

Example

The apparatus for modifying surface of polymer powder by rotational ultrasonic treatment of the present invention was used. The gap between the rotating disk 4 and the ultrasonic vibrator 5 was fixed, and the rotating disk 4 was rotated at a constant speed, so that waste rubber powder 16 is modified and discharged.

The gap between the rotating disk 4 and the ultrasonic vibrator 5 was set as smaller than 10 mm.

The rotation speed of the rotating disk 4 was set at 10 to 400 rpm.

Experimental Example

In order to identify the surface modification effect of the waste rubber powder, crosslinkage densities of re-vulcanized waste rubber powder, which had not been treated with ultrasonication, and of re-vulcanized waste rubber powder, which had been treated with ultrasonication, were compared.

The crosslinkage density of the sample not treated by ultrasonic wave was $5.111 \times 10^{18}$ mole/cm$^3$, and that of ultrasonic treatment sample was $6.241 \times 10^{18}$ mole/cm$^3$.

That is, the surface modification by ultrasonic wave offered an outstanding result, which is also confirmed in FIG. 5 and FIG. 6.

Also, the ultrasonic treatment improved internal bonding of the re-vulcanized waste rubber as the S—S bonds are broken and re-arranged, as shown in FIG. 7.

Accordingly, the apparatus for modifying surface of polymer powder by rotational ultrasonic treatment according to the present invention can reduce sulfur crossinkage by spatial expansion due to intramolecular pore activation, and improve physical properties of waste rubber by ultrasonic surface treatment. Therefore, the binding characteristics and physical properties of waste rubber powder are improved, and thus resources recycling effect becomes substantial.

Especially, the rotational ultrasonic treatment allows modification of the entire surface of waste rubber particle. As a result, the modification efficiency is greatly improved, and the surface modification can be carried out continuously, which offers advantage to mass treatment of waste rubber.

As described above, the apparatus and the method for modifying surface of polymer powder by rotational ultrasonic treatment according to the present invention pulverize polymer materials, such as rubber, waste rubber, and plastics, and give rotational ultrasonic treatment to the polymer powder to modify its surface, so that the polymer materials can be recycled more efficiently.

Especially, the rotational ultrasonic treatment allows modification of the entire surface of waste rubber particle. As a result, the modification efficiency is greatly improved, and the surface modification can be carried out continuously, which offers advantage to mass treatment of waste rubber.

The recycling of polymer materials will save materials import expenses and offer substantial competitive power, which is considered to influence and improve the rubber industry.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An apparatus for modifying surface of polymer powder by rotational ultrasonic treatment, which comprises:
    a hopper which feeds pulverized polymer powder;
    a rotor which is linked to the bottom of the hopper as an integrated body, linked to a driving means through a power transferring means, and rotates by the power transferred from the driving means;
    a rotating disk which is linked to the bottom of the rotor as an integrated body by a bolt, and is provided with a downsloped planed at the center;
    a shaft which extends through centers of the hopper, the rotor, and the rotating disk, and discharges the polymer powder fed from the hopper out the bottom of the rotating disk;
    an ultrasonic vibrator which is positioned at the bottom of the rotating disk with a gap, and modifies the polymer powder fed by the shaft using ultrasonic wave, wherein the ultrasonic vibrator is attached to a second supporting plate which can move up and down through rails, so that the gap between the rotating disk and the ultrasonic vibrator can be controlled;
    a converting means which is linked to the bottom of the ultrasonic vibrator, and comprises a booster and a converter; and
    a generator which is linked to the converting means through a cable.

2. The apparatus for modifying surface of polymer powder by rotational ultrasonic treatment according to claim 1, wherein there is provided a downsloped plane with a predetermined angle at the bottom of the rotating disk so that the polymer powder can be discharged easily.

3. The apparatus for modifying surface of polymer powder by rotational ultrasonic treatment according to claim 1, which further comprises a discharging plate that encompasses the lower gap between the rotating disk and the ultrasonic vibrator, and guides the polymer powder discharged outward.

4. The apparatus for modifying surface of polymer powder by rotational ultrasonic treatment according to claim 1, wherein the power transferring means is a combination of a timing belt and a pulley.

5. A method of modifying polymer powder using rotational ultrasonic treatment, wherein polymer powder is fed between a rotating disk and an ultrasonic vibrator, which are positioned with a gap, and treated with ultrasonication while being rotated, and then discharged by the centrifugal force due to the rotation of the rotating disk, wherein the modification degree and quantity of which are controlled by controlling the rotation speed of the rotating disk and the gap between the rotating disk and the ultrasonic vibrator.

6. The method of modifying polymer powder by rotational ultrasonic treatment according to claim 5, wherein the polymer powder is rubber, waste rubber, waste tires, or plastic powder.

* * * * *